United States Patent

Ramanathan et al.

[15] 3,687,929

[45] Aug. 29, 1972

[54] BASIC DYESTUFFS CONTAINING A QUATERNIZED PYRIDINE OR QUINOLINE RADICAL

[72] Inventors: Visvanathan Ramanathan, Klybeckstrasse 18, Basel; Hans Wilhelm Liechti, Breugglistrasse 7, Oberwil, Basel Land, both of Switzerland

[22] Filed: May 26, 1969

[21] Appl. No.: 828,008

Related U.S. Application Data

[63] Continuation-in-part of Ser. No. 520,863, Jan. 17, 1966, abandoned.

[30] Foreign Application Priority Data

Jan. 18, 1965 Switzerland................674/65

[52] U.S. Cl................260/156, 260/146 R, 260/155, 260/158, 260/163, 260/206, 260/239.8, 260/240 J, 260/240 R, 260/287 R, 260/293.69, 260/294.8 A, 260/294.8 C, 260/294.8 F, 260/294.8 R, 260/295 AM, 260/295.5 T, 8/41

[51] Int. Cl.................................................C09b 29/36
[58] Field of Search................260/155, 156, 146

[56] References Cited

UNITED STATES PATENTS

| | | |
|---|---|---|
| 3,501,453 | 3/1970 | Steinemann...............260/156 |
| 1,887,996 | 11/1932 | Conzetti....................260/156 |
| 3,148,181 | 9/1964 | Wallace et al.............260/156 |

*Primary Examiner*—Joseph Rebold
*Assistant Examiner*—Donald M. Papuga
*Attorney*—Harry Goldsmith, Joseph G. Kolodny and Mario A. Monaco

[57] ABSTRACT

Basic azo-dyestuffs containing a quaternized pyridine- or quinoline carbonyloxy- or carbonylimino-radical bound to an aromatic nucleus directly or via an alkylene-, alkylene- oxy- or alkyleneimino bridge.

5 Claims, No Drawings

BASIC DYESTUFFS CONTAINING A QUATERNIZED PYRIDINE OR QUINOLINE RADICAL

CROSS-REFERENCES TO RELATED APPLICATION

This is a continuation in part of application Ser. No. 520,863, filed Jan. 17, 1966, now abandoned.

DESCRIPTION OF THE PREFERRED EMBODIMENTS

The present invention is based on the observation that valuable basic dyestuffs free from acid groups imparting solubility in water, especially sulphonic and carboxylic acid groups, and corresponding to the formula $$[A-Z-CO-Y^+]_x-$$

wherein A represents the residue of an organic dyestuff, Z an oxygen atom or an —NH— group, X an anion and $Y^+$ and 5- or 6- membered heterocyclic residue containing a quaternary ammonium group as a cyclic member may be obtained when (a) a dyestuff of the formula $$A-Z-CO-Y$$

wherein A and Z have the above meanings and Y represents a 5- or 6-membered heterocyclic ring which contains a nitrogen atom as a cyclic member, is treated with an alkylating agent; or (b) a dyestuff intermediate containing the residue of the formula $$[-Z-CO-Y^+]_x-$$

is converted by a suitable reaction, for example by condensation or coupling, into the dyestuff of the above formula, or (c) a dyestuff containing the residue of the formula $$-Z-H$$

is acylated with a halide of a carboxylic acid of the formula $$[HOOC-Y^+]_x-$$

Particularly suitable starting materials are dyestuffs of the azo or anthraquinone series; nitro, methine, styryl and quinophthalone dyestuffs are also suitable. The dyestuff residues are bound to the heterocyclic residue Y through a carboxylic acid ester group or a carbamide group. Advantageously —OCY represents the residue of a pyridine carboxylic acid, for example pyridine-2-, -3- or -4-carboxylic acid. The residue —OCY may also be derived from one of the following heterocyclic carboxylic acids: quinoline-4- or -8- carboxylic acid, pyrazolone-3-carboxylic acid-5, 1-phenyl-pyrazolone-3-carboxylic acid-5, thiazole-2-carboxylic acid, benzthiazole-2- or -6-carboxylic acid.

The dyestuffs to be used as starting materials may be obtained by acylating a suitable organic dyestuff, especially a disperse dyestuff containing an acylatable hydroxyl or amino group, with the halide of a 5-membered or 6-membered heterocyclic carboxylic acid that contains a nitrogen atom as a cyclic member.

Particularly valuable starting materials are azo dyes, especially those of the formula $$X_1-\underset{Z_1}{\overset{Y_1}{\bigcirc}}-N=N-\underset{V}{\overset{W}{\bigcirc}}-\underset{R}{N}-C_2H_4OCO-\bigcirc_N$$

where $X_1$ represents a hydrogen or halogen atom, a cyano, carbalkoxy, alkylsulphonyl, phenylazo or nitro group, $Y_1$ a hydrogen or halogen atom, a nitro, alkyl, alkoxy, trifluoromethyl, carbalkoxy or cyano group and $Z_1$ represents a hydrogen or halogen atom, at least one of the residues $X_1$ and $Y_1$ representing a nitro, carbalkoxy, cyano, alkylsulphonyl or phenylazo group, V represents a hydrogen or halogen atom, an alkyl, alkoxy or acylamino group, W a hydrogen atom, an alkyl or alkoxy group, and R represents an alkyl, cyanoalkyl, alkoxyalkyl or acyloxyalkyl group. Wherever herein the structural formula $$\bigcirc_N$$

appears, it refers to the pyridyl structure.

As examples of starting materials for use in the present process the following dyestuffs may be mentioned (in the given formulas —COPy represents the residue of pyridine-3- or -4-carboxylic acid):

a. Azo dyes $$\bigcirc-N=N-\bigcirc-NHCO-Py$$

$$O_2N-\bigcirc-N=N-\bigcirc-NHCO-Py$$

$$CH_3O-\bigcirc-N=N-\underset{NHCOPy}{\overset{OH}{\bigcirc}}$$

$$PyCOHN-\bigcirc-N=N-\underset{CH_3}{\overset{OH}{\bigcirc}}$$

$$O_2N-\bigcirc-N=N-\bigcirc-N\underset{CH_2CH_2OCOPy}{\overset{C_2H_5}{}}$$

$$O_2N-\underset{}{\overset{Cl}{\bigcirc}}-N=N-\bigcirc-N(CH_2CH_2OCOPy)_2$$

$$O_2N-\underset{NO_2}{\overset{Cl}{\bigcirc}}-N=N-\underset{NHCOCH_3}{\overset{OCH_3}{\bigcirc}}-N(CH_2CH_2OCOPy)_2$$

$$PyCOOCH_2CH_2-\bigcirc-N=$$

$$N-\underset{OCH_3}{\overset{CH_3}{\bigcirc}}-N=N-\bigcirc-OH$$

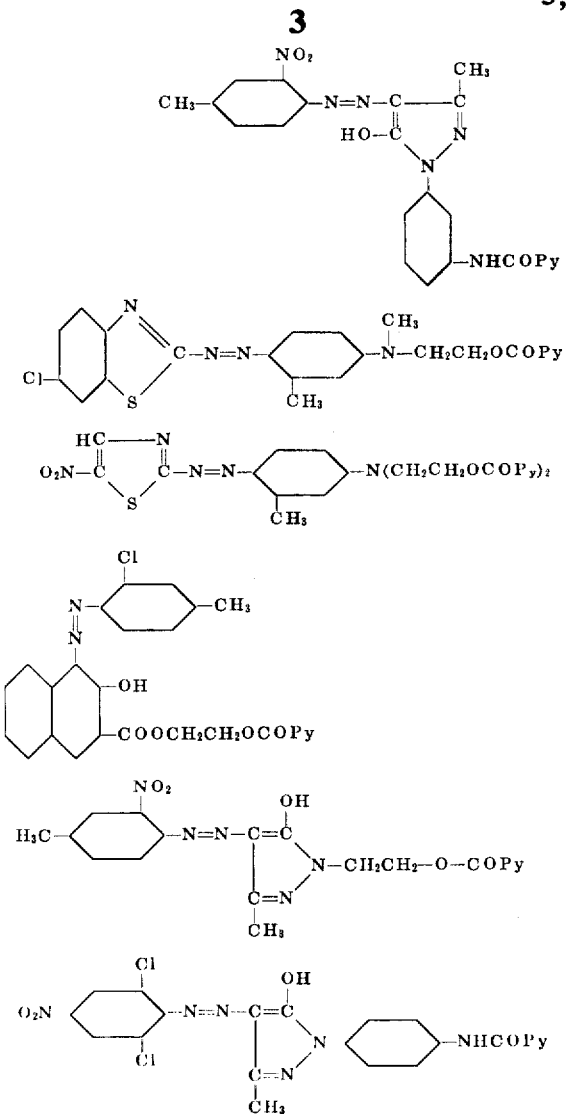

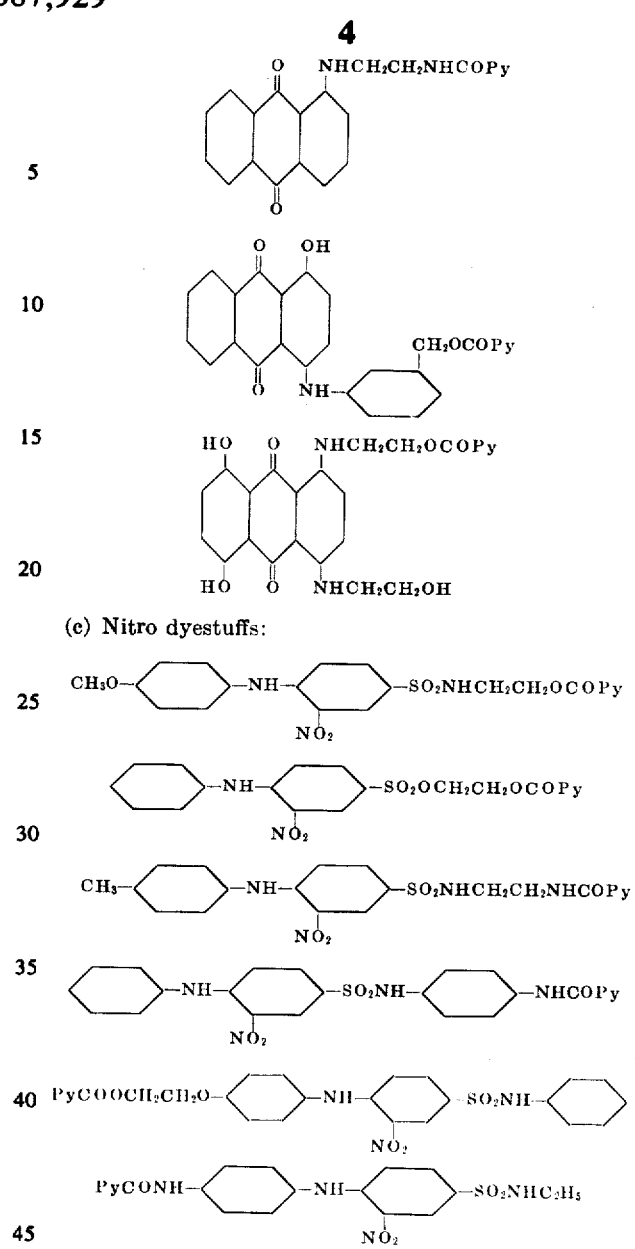

b. Dyestuffs of the anthraquinone series:

1- and 2-nicotinyl-aminoanthraquinone, 1-amino-4-nicotinylaminoanthraquinone, 1-amino-2-bromo-4-nicotinyl-aminoanthraquinone, 1-amino-2-methoxy- (or -2-methyl- or -2-nitro-)-4-nicotinyl-amino-anthraquinone, 1-anilino-4-nicotinyl-aminoanthraquinone, 5-nicotinylamino-1,4-dihydroxyanthraquinone and 5-nicotinylamino-1,9-isothiazoleanthrone, and the dyestuffs of the formula

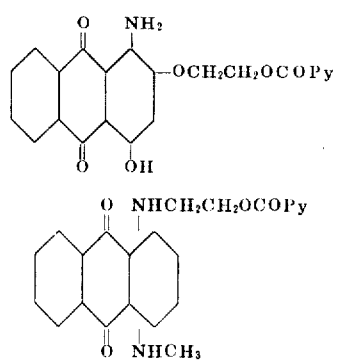

(c) Nitro dyestuffs:

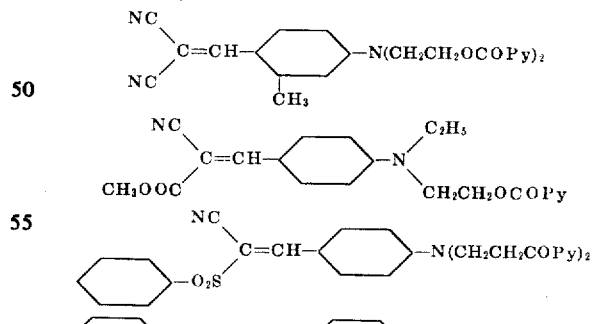

(d) Styryl dyestuffs:

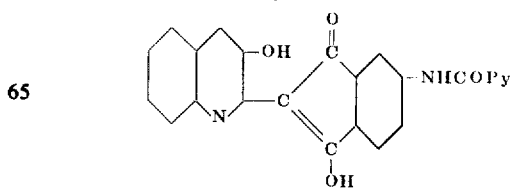

(e) Quinophthalone dyestuffs:

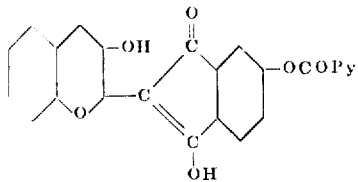

The above-mentioned dyestuffs are treated according to this invention with alkylating agents, advantageously with alkyl or aralkyl halides or with the alkyl or aralkyl esters of sulphuric acid or of organic sulphonic acids. As examples of alkylating agents the following may be mentioned: Methylchloride, methylbromide or methyliodide, benzylchloride, β-chloropropionic acid methyl ester, β-chloropropionic acid amide, trimethyloxonium borofluoride, dimethyl sulphate, diethyl sulphate, benzenesulphonic acid methyl ester and para-toluenesulphonic acid ethyl or butyl ester. Alkylation is advantageously performed by heating in an inert organic solvent, for example in a hydrocarbon e.g., benzene, toluene or xylene, or in a chlorinated hydrocarbon e.g., carbon tetrachloride, tetrachloroethane, chlorobenzene or ortho-dichlorobenzene, or in a nitrated hydrocarbon e.g., nitromethane, nitrobenzene or a nitronaphthalene.

The variant (b) of the present process is particularly suitable for the manufacture of azo dyes. For this purpose a diazotized amine is coupled with a coupling component, either the diazo or the coupling component containing the residue of the formula

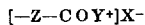

Preferred diazo components are amines of the benzene series, and preferred coupling components are aminobenzenes, hydroxybenzenes, aminonaphthalenes, hydroxynaphthalenes, pyrazolones and acetoacetic arylides. The coupling is carried out in known manner.

According to variant (c) of the present process a dyestuff that contains an acylatable amino or hydroxyl group, for example one of the dyestuffs mentioned above which contains a hydrogen atom in place of the residue —COPy, is acylated with a halide of a carboxylic acid of the formula

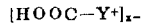

preferably of a quaternated pyridine carboxylic acid, for example with the chloride of the formula

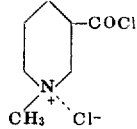

For purification the dyestuff salts are advantageously dissolved in water, any unreacted starting dyestuff being filtered off as an insoluble residue. By addition of a water-soluble salt, for example sodium chloride, to the aqueous solution the dyestuff can be reprecipitated.

The anion of the dyestuffs obtained by the present process is preferably the residue of a strong acid, for example sulphuric acid or a semi-ester thereof or an arylsulphonic acid, or it is a halogen ion. The aforementioned anions introduced according to this invention into the dyestuff molecule may be replaced by anions of other inorganic acids, for example the anion of phosphoric or sulphuric acid, or those of organic acids, for example formic, acetic, chloroacetic, oxalic, lactic or tartaric acid; in certain cases the free bases may also be used. The dyestuff salts may also be used in the form of double salts, for example with halides of elements of Group 2 of the Periodic Table, especially zinc or cadmium chloride.

The dyestuff salts obtained according to this invention are suitable for dyeing or printing a wide variety of materials, for example tanned cellulose fibers, silk, hairs, leather or fully synthetic fibers, especially polyacrylonitrile or polyvinylidene cyanide (Darvan). The dyeings obtained on these fibers are distinguished by good fastness to light. The dyestuffs also build up well on polyacrylonitrile fibers and reserve well on wool which makes them particularly suitable for dyeing union fabrics containing polyacrylonitrile. Over comparable dyestuffs described in U.S. Pat. No. 2,359,864 the present dyestuff shows the technical advantage in that they can also be applyed on polyacrylonitril fibers at temperatures above 100°, for example at 130°.

Unless otherwise indicated, parts and percentages in the following Examples are by weight.

EXAMPLE 1

26.7 parts of nicotinic acid chloride hydrochloride are added at 0° to 5°C to a solution of 21.67 parts of 4'-N,N-dihydroxyethyl-amino-2,2', 6-trichloro-4-nitroazobenzene in 75 parts of pyridine. The batch is slowly heated and stirred for 3 hours at about 80°C, allowed to cool, poured into ice water and neutralized with sodium hydroxide solution. The precipitated dyestuff is filtered by suction, rinsed with water and dried.

The dried dinicotinic acid ester is dissolved in 100 parts of chlorobenzene, and a solution of 19 parts of dimethyl sulphate in 100 parts of chlorobenzene is added. The mixture is stirred for about 5 hours at 80°C and then cooled. The chlorobenzene layer is separated. The residue is dissolved in water and the product is salted out with sodium chloride and zinc chloride. The precipitated dyestuff of the formula

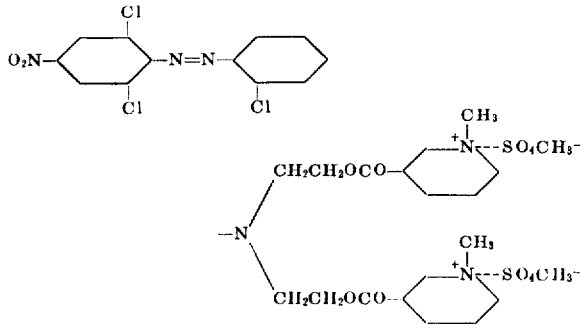

is filtered by suction and dried; it dyes polyacrylonitrile fibers brown shades having very good properties of fastness.

DYEING INSTRUCTIONS 1 part of the dyestuff obtained as above is dissolved in 500 parts of water with addition of 2 parts of 40 per cent acetic acid. 100 parts of dried yarn from polyacrylonitrile staple fibers are immersed in this bath at 60°C, the temperature is raised within half an hour to 100°C and the yarn is dyed for 1 hour at the boil. The dyeing is then thoroughly rinsed and dried. The resulting brown shade displays very good fastness to light, sublimation and washing.

EXAMPLE 2

13.4 parts of nicotinic acid chloride hydrochloride are added at 0° to 5°C to a solution of 18.2 parts of 4′, N-hydroxyethyl-N-cyanoethylamino-2-cyano-4-nitroazobenzene in 75 parts of pyridine. The batch is slowly heated and stirred for 3 hours at about 80°C, allowed to cool, poured into ice water and neutralized with sodium hydroxide solution. The precipitated dyestuff is suction-filtered, washed with water and dried.

The dried mono-nicotinic acid ester is dissolved in 250 parts of chlorobenzene and a solution of 9.5 parts of dimethyl sulphate in 50 parts of chlorobenzene is added. The mixture is stirred for about 5 hours at 80°C and then cooled. The chlorobenzene layer is separated. The residue is dissolved in water and the product salted out with sodium chloride and zinc chloride. The precipitated dyestuff of the formula

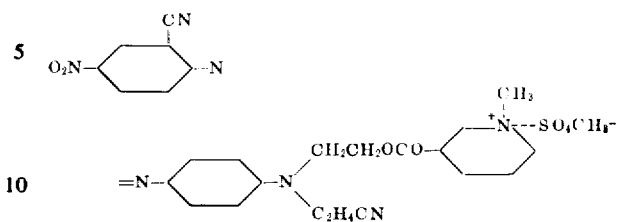

is suction-filtered and dried; it dyes polyacrylonitrile fibers red-brown shades having very good properties of fastness.

In column I of the following Table more dyestuffs are listed which may be reacted as described above with the alkylating agent shown in column II to give further azo dyestuffs in accordance with the invention. The shades obtained with the resulting dyestuffs on polyacrylonitrile fibers are listed in column III:

| No. | I | II | III |
|---|---|---|---|
| 1 | $O_2N-\langle\rangle-N=N-\langle\rangle-N(CH_2CH_2OCO-\langle N\rangle)_2$ with CN | $(CH_3)_2SO_4$ | Brown. |
| 2 | $O_2N-\langle\rangle-N=N-\langle\rangle-N(CH_2CH_2CN)(CH_2CH_2OCO-\langle N\rangle)$ with Cl | $(CH_3)_2SO_4$ | Scarlet. |
| 3 | $O_2N-\langle\rangle-N=N-\langle\rangle-N(C_2H_4CN)(C_2H_4OCO-\langle N\rangle)$ with Cl | $(CH_3)_2SO_4$ | Do. |
| 4 | $O_2N-\langle\rangle-N=N-\langle\rangle-N(C_2H_5)(C_2H_4OCO-\langle N\rangle)$ with Cl | n-$C_4H_9Br$ | Ruby red. |
| 5 | $O_2N-\langle\rangle-N=N-\langle\rangle-N(C_2H_4CN)(C_2H_4OCO-\langle\langle N\rangle\rangle)$ with Cl | $CH_3-\langle\rangle-SO_3CH_3$ | Scarlet. |
| 6 | $\langle\rangle-N=N-\langle\rangle-N=N-\langle\rangle-N(C_2H_4CN)(C_2H_4OCO-\langle N\rangle)$ | $\langle\rangle-CH_2Cl$ | Brown. |
| 7 | $O_2N-\langle\rangle-N=N-\langle\rangle-N(C_2H_5)(C_2H_4OCO-\langle N\rangle)$ | $(CH_3)_2SO_4$ | Scarlet. |
| 8 | $O_2N-\langle\rangle-N=N-\langle\rangle-N(CH_2-\langle\rangle)(C_2H_4OCO-\langle N\rangle)$ with $CF_3$ | $(C_2H_5)_2SO_4$ | Red. |

| No. | I | II | III |
|---|---|---|---|
| 9 | 4-Cl-C₆H₃(CF₃)-N=N-C₆H₄-N(C₄H₉)(CH₂CH(CH₃)-O-CO-piperidin-2-yl) | CH₃I | Scarlet. |
| 10 | 2-COOCH₃-4-O₂N-C₆H₃-N=N-C₆H₂(OCH₃)(CH₃)-N(CH₂COOC₂H₅)(CH₂CH₂-O-CO-piperidin-4-yl) | C₆H₅-SO₃CH₃ | Red. |
| 11 | 2-Cl-4-CH₃SO₂-C₆H₃-N=N-C₆H₄-N(C₂H₄COOC₂H₅)(C₂H₄-O-CO-(1,2,3,4-tetrahydroquinolin-2-yl)) | (CH₃)₂SO₄ | Scarlet. |
| 12 | 2-SO₂CH₃-4-O₂N-C₆H₃-N=N-C₆H₃(OCH₃)-N(C₂H₄OCH₃)(C₂H₄-O-CO-(decahydroquinolin-3-yl)) | (CH₃)₂SO₄ | Ruby red. |
| 13 | 2,5-Cl₂-4-(CH₃)₂NO₂S-C₆H₂-N=N-C₆H₄-N(C₂H₄COOCH₃)(CH₂CH₂-O-CO-piperidin-3-yl) | C₄H₉Br | Brown. |
| 14 | 2-Br-4-O₂N-C₆H₃-N=N-C₆H₄-N(CH₂-C₆H₁₁)(C₂H₄-N(CH₃)-CO-piperidin-2-yl) | HOC₂H₄Cl | Red. |
| 15 | 2-CN-4-Cl-C₆H₃-N=N-C₆H₄-N(C₄H₉)(C₂H₄-N(C₆H₁₁)-CO-piperidin-2-yl) | CH₃-C₆H₄-SO₃CH₃ | Scarlet. |
| 16 | 2-NO₂-4-O₂N-C₆H₃-N=N-C₆H₄-N(C₂H₅)(CH₂CH₂CH₂-NH-CO-(decahydroquinolin-3-yl)) | (CH₃)₂SO₄ | Ruby red. |
| 17 | 2-CN-4-O₂N-C₆H₃-N=N-C₆H₄-N(-CH₂CH₂-N(-CO-piperidin-2-yl)-CH₂CH₂-) | C₂H₅I | Red. |
| 18 | piperidin-3-yl-COOCH₂CH₂HNO₂S-C₆H₄-N=N-C₆H₄-N(C₂H₅)(C₂H₄CN) | C₄H₉Br | Orange. |
| 19 | piperidin-4-yl-COO(CH₂)₂HNO₂S-C₆H₃(Cl)-N=N-C₆H₄-N(C₂H₄OCH₃)(C₂H₄COOC₂H₅) | (CH₃)₂SO₄ | Scarlet. |
| 20 | piperidin-2-yl-COO-CH₂CH₂HNO₂S-(benzothiazol-2-yl)-N=N-C₆H₃(CF₃)-N(C₂H₄OCOCH₃)(C₂H₄OCOCH₃) | C₆H₄-SO₃CH₃ | Red. |

| No. | I | II | III |
|---|---|---|---|
| 21 | (structure: nitrophenyl-N=N-phenyl-N(C₂H₄CN)(C₂H₄OCOCH₃) with piperidine-COOH₄C₂O) | (CH₃)₂SO₄ | Scarlet. |
| 22 | (structure: piperidine-COO-CH₂CH₂OOC-phenyl-N=N-pyrazolone with N-(4-nitrophenyl); HO-C, C-CH₃) | (CH₃)₂SO₄ | Yellow. |
| 23 | (structure: O₂N-phenyl-N=N-C(HO)=C(CH₃)-NH pyrazole; piperidine-COOH₄C₂O) | (C₂H₅)₂SO₄ | Do. |
| 24 | (structure: O₂N-phenyl-N=N-naphthyl(OH)(SO₂NH₂); piperidine-COOH₄C₂O) | (CH₃)₂SO₄ | Scarlet. |
| 25 | (structure: O₂N-phenyl-N=N-naphthyl(OH)(CH₂NHCOCH₃); piperidine-COOH₄C₂O) | (CH₃)₂SO₄ | Do. |
| 26 | (structure: O₂N-phenyl-N=N- quinolone(OH)(N-CH₃, =O); piperidine-COOH₄C₂O) | (CH₃)₂SO₄ | Orange. |
| 27 | (structure: O₂N-phenyl(OC₂H₄OCO-piperidine)-N=N-phenyl-N(C₂H₄CN)(C₂H₄OCO-piperidine)) | (CH₃)₂SO₄ | Scarlet. |
| 28 | (structure: piperidine-COOC₂H₄HNO₂S-phenyl-N=N-phenyl-N(C₂H₄COOC₂H₅)(C₂H₄OCO-piperidine)) | (CH₃)₂SO₄ | Orange. |
| 29 | (structure: piperidine-COOC₂H₄OOC-phenyl-N=N-pyrazolone with N-(4-(NHCO-piperidine)phenyl); HO-C, C-CH₃) | (CH₃)₂SO₄ | Yellow. |

| No. | I | II | III |
|---|---|---|---|
| 30 | (structure: pyridine-CONH-C6H3(Cl)-N=N-C6H3(OH)(NHCO-piperidine)) | $(CH_3)_2SO_4$ | Do. |

EXAMPLE 3

26.7 parts of isonicotinic acid chloride hydrochloride are added at 0° to 5°C to a solution of 13.55 parts of 4 [N,N-bis-(2'-hydroxyethyl)-amino]2-methylbenzylidene malonitrile in 75 parts of pyridine. The mixture is slowly heated and stirred for 3 hours at about 80°C, then cooled, poured into ice water and neutralized with sodium hydroxide solution. The precipitated dyestuff is suction-filtered, washed with water and dried.

The dried diisonicotinic acid ester is dissolved in 100 parts of chlorobenzene and a solution of 19 parts of dimethyl sulphate in 100 parts of chlorobenzene is added, the mixture is stirred for about 5 hours at 80°C and then cooled. The chlorobenzene layer is separated, the residue dissolved in water and the product salted out with sodium chloride and zinc chloride. The precipitated dyestuff of the formula

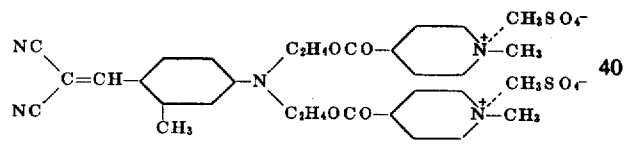

is suction-filtered and dried; it dyes polyacrylonitrile fibers greenish yellow shades having very good properties of fastness.

In column I of the following table further dyestuffs are listed which may be treated as described above with the alkylating agent shown in column II to give styryl dyestuffs in accordance with the invention. The resulting dyestuffs produce on polyacrylonitrile fibers the shades shown in column III.

EXAMPLE 4

9.35 parts of nicotinyl chloride hydrochloride are slowly added in portions while stirring at about 20°C to a mixture of 15.85 parts of 1,4-diamino-2-bromo-anthraquinone in 41 parts of N-methylpyrrolidone, and the reaction mixture is then stirred for 6 hours. The batch is diluted with water and the precipitated dyestuff suction-filtered. The filter cake is suspended in water, rendered faintly alkaline with sodium carbonate solution, stirred, filtered once more, rinsed with water and dried.

The dried product is dissolved in 125 parts of nitrobenzene and a solution of 9.5 parts of dimethyl sulphate in 50 parts of nitrobenzene is added. The mixture is stirred for about 5 hours at 90°C and then cooled. The nitrobenzene layer is separated and the residue dissolved in hot water, filtered and the filtrate is salted out with sodium chloride. The precipitated dyestuff of the formula

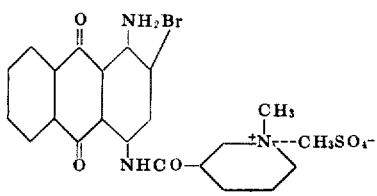

is filtered and dried; it dyes polyacrylonitrile fibers red-violet shades having very good properties of fastness.

In column I of the following table further dyestuffs are listed which may be treated as indicated above with the alkylating agent of column II to give further dyestuffs in accordance with the invention. The resulting dyestuffs produce on polyacrylonitrile fibers the shades shown in column III.

| No. | I | II | III |
|---|---|---|---|
| 1 | (structure: (NC)₂C=CH-C6H3(CH3)-N(CH2CH2OCO-pyridine)₂) | Dimethyl-sulphate. | Greenish yellow. |
| 2 | (structure: (NC)₂C=CH-C6H4-N(C2H5)(CH2CH2OCO-pyridine)) | ...do... | Do. |

| No. | I | II | III |
|---|---|---|---|
| 1 | (anthraquinone with NH₂ and NHCO-piperidine) | (CH₃)₂SO₄ | Violet. |
| 2 | (anthraquinone with NH₂, OCH₃, NHCO-piperidine) | Same as above | Red-violet. |
| 3 | (anthraquinone with OH, NHCO-piperidine) | ....do.... | Orange. |
| 4 | (anthraquinone with OH, NH-C₆H₄-NHCO-piperidine) | ....do.... | Blue. |
| 5 | (anthraquinone with NH₂, OC₂H₄OCO-piperidine, OH) | ....do.... | Ruby red. |
| 6 | (bis-thiophene-indigoid with NHCO-piperidine groups) | ....do.... | Violet. |

EXAMPLE 5

A solution of 9.5 parts of dimethyl sulphate in 50 parts of chlorobenzene is stirred into a solution of 17.85 parts of 5-nicotinoylamino-1,9-isothiazole-anthrone in 75 parts of chlorobenzene. The mixture is stirred for about 5 hours at 80°C and then cooled. The chlorobenzene layer is separated and the residue dissolved in hot water, filtered, and the filtrate is mixed with sodium chloride. The precipitated dyestuff of the formula

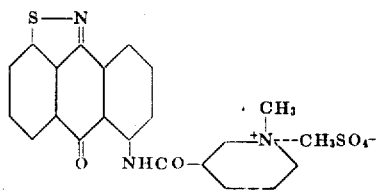

is filtered and dried; it dyes polyacrylonitrile fibers yellow shades having excellent properties of fastness.

EXAMPLE 6

A hydrochloric acid solution of 21.3 parts of 4-nicotinylaminoaniline is diazotized with sodium nitrite and coupled at 10°C in a solution, rendered alkaline with sodium carbonate, with 10.8 parts of 1-hydroxy-4-methylbenzene. The dyestuff formed is separated and dried.

The dyestuff is dissolved at 110°C in 500 parts of anhydrous chlorobenzene and 12.6 parts of dimethyl sulphate are added dropwise within 15 minutes at this temperature. The batch is then stirred for 1 ½ hours at 120° to 125°C and allowed to cool, whereupon the quaternated dyestuff precipitates quantitatively; it is separated, dissolved in 1,500 parts of hot water, stirred with active carbon and clarified by filtration. When 100 parts of sodium chloride are added to the filtrate, the pure dyestuff precipitates quantitatively. After cooling, it is filtered, washed with ice water and dried.

The new dyestuff of the formula

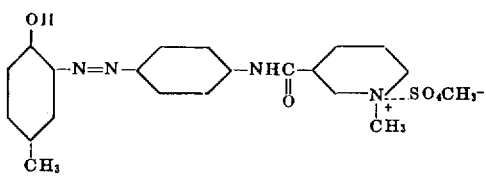

forms a yellow, water-soluble powder which dyes polyacrylonnitrile fibers brilliant yellow shades which are very fast to light.

Dyestuffs that color polyacrylonitrile fibers similar shades of equally good fastness to light are obtained by using as coupling component 1-hydroxy-4-cyclohexyl-benzene, 1-hydroxy-4-phenylbenzene, 1-hydroxy-4-tertiary butylbenzene or 1-hydroxy-4-acetylaminobenzene instead of 1-hydroxy-4-methylbenzene.

When the diazo compounds of the amines listed in column I of the table below are coupled in the same manner with coupling components mentioned in column II and the resulting azo dyestuffs are quaternated with the alkylating agents mentioned in column III, dyestuffs are obtained which have similar fastness properties and dye acrylonitrile fibers the shades indicated in column IV.

hydrochloric acid. The batch is clarified by filtration through active carbon and the pure dyestuff is salted out from the filtrate with sodium chloride, filtered, washed with ice water and dried. The resulting dyestuff of the formula

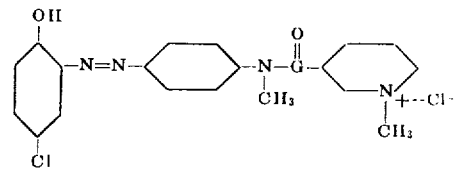

forms a yellow powder which dyes polyacrylonitrile fibers brilliant yellow shades of excellent fastness to light.

A dyestuff that also dyes polyacrylonitrile fibers brilliant yellow shades of excellent fastness to light is also obtained when 4-(N-ethylnicotinylamino)-aniline hydrochloride is used as diazo component.

EXAMPLE 8

24.3 parts of 2-hydroxy-5-amino-4'-methoxy-1,1'-azobenzene are dissolved by heating in 200 parts of pyridine and 14.2 parts of nicotinyl chloride are added within 10 minutes at 80°C. The batch is stirred for another 1½ hours at 80° to 85°C and then allowed to cool. The reaction mass is slowly dropped into 1,000 parts of water and the precipitated dyestuff is isolated and dried.

The new dyestuff is dissolved at 110°C in 200 parts of dry dimethylformamide and 12.6 parts of dimethyl

| | I | II | III | IV |
|---|---|---|---|---|
| 1 | ![](Cl-substituted piperidine-COHN-phenyl-NH₂) | OH-cyclohexyl with CH₂-CH₂-CH₂-CH₂ | (CH₃)₂SO₄ | Yellow. |
| 2 | ![](Br-substituted piperidine-COHN-phenyl-NH₂) | OH-phenyl-CH₃ with CH₃ | phenyl-SO₃CH₃ | Do. |
| 3 | ![](tetrahydroquinoline-COHN-phenyl(OCH₃)-NH₂) | OH-phenyl-CH₃ with CH₃ | CH₃-phenyl-SO₃CH₃ | Do. |
| 4 | ![](CH₃-substituted quinoline-COHN-phenyl-NH₂) | OH-phenyl-Br | (C₂H₅)₂SO₄ | Do. |

EXAMPLE 7

26.35 parts of 4-(N-methylnicotinylamino)-aniline chloride are diazotized and coupled at 0° to 5°C with 12.85 parts of 1-hydroxy-4-chlorobenzene in a solution rendered alkaline with sodium carbonate. The dyestuff is isolated and dissolved in 1,500 parts of hot, dilute sulphate are added within 15 minutes. The batch is heated for another 1½ hours at 120° to 125°C, allowed to cool, poured into 1,500 parts of dilute hydrochloric acid, filtered hot with addition of active carbon, and the pure dyestuff is salted out of the filtrate with sodium chloride; it is isolated, washed on the suction filter with a small amount of ice water and dried. The new, water-soluble dyestuff of the formula

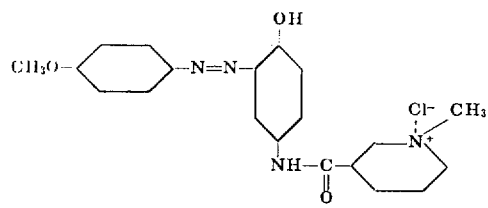

forms a yellow powder which dyes polyacrylonitrile fibers brilliant yellow shades of very good fastness to light.

Dyestuffs that also dye polyacrylonitrile fibers yellow shades fast to light are obtained by using as the starting dyestuff 2-hydroxy-5-amino-4'-ethoxy-1,1'-azobenzene, 2-hydroxy-5-amino-4'-chloro-1,1'-azobenzene, 2-hydroxy-5-amino-1,1'-azobenzene, 4-amino-1,1'-azobenzene or 4-amino-4'-nitro-1,1'-azobenzene.

When the azo dyestuffs listed in column I of the Table below are reacted in the same manner with the acid chlorides mentioned in column II, and the resulting products are quaternated with the alkylating agents mentioned in column III, dyestuffs are obtained which have similar properties and dye acrylonitrile fibers the shades indicated in column IV.

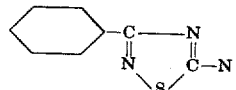

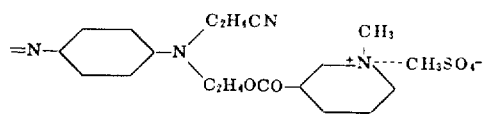

is filtered and dried; it dyes polyacrylonitrile fibers red shades having excellent properties of fastness.

The coupling component used above may be prepared by the following method:

44.5 parts of nicotinylchloride hydrochloride are added at 0° to 5°C to a solution of 38 parts of N-β-hydroxyethyl-N-β-cyanoethylaniline in 120 parts of pyridine. The mixture is slowly heated and stirred for 3 hours at about 80°C, allowed to cool, poured into ice water and neutralized with sodium hydroxide solution. The precipitated ester is suction-filtered, rinsed with water and dried.

29.5 parts of the dried nicotinic acid ester are dissolved in 200 parts of warm chlorobenzene and a solution of 18.9 parts of dimethyl sulphate in 50 parts of chlorobenzene is added. The mixture is stirred for about 4 hours at 90° to 95°C and then cooled. The

| | I | II | III | IV |
|---|---|---|---|---|
| 1 | H₂N–⟨⟩–N=N–⟨⟩ with OCH₃, OH, CH₃ | ⟨N⟩–COCl | ⟨⟩–CH₂Cl | Yellow. |
| 2 | H₂N–⟨⟩–N=N–⟨⟩ with CH₃, OH, Cl | ⟨N⟩–COCl | C₄H₉Br | Do. |
| 3 | H₂N–⟨⟩–N=N–⟨⟩ with Cl, OH, OCH₃ | ⟨N⟩–COCl (naphthyl) | (CH₃)₂SO₄ | Do. |

EXAMPLE 9

2.66 parts of 5-amino-3-phenyl-1,2,4-thiadiazole are diazotized in known manner and coupled with an aqueous solution of 6.32 parts of N-β-cyanoethyl-Nβ-(N'-methylnicotinyl)-hydroxyethylaniline methosulphate. The coupling mixture is rendered neutral to Congo red with sodium acetate solution. On completion of the coupling the reaction mixture is salted out and filtered. The suction filter cake is dissolved hot in water, clarified by filtration and once more salted out. The precipitated dyestuff of the formula chlorobenzene layer is separated and the product washed with petroleum ether and dried. The quaternary salt dissolves completely in water and the solution may be used for the coupling reaction.

The following table lists a number of further components which yield dyestuffs in accordance with the invention when, as indicated above the diazo component of column I is coupled with the coupling component of column II.

| No. | Diazo component | Coupling component | Shade |
|---|---|---|---|
| 1 | 2,6-dichloro-4-nitroaniline | ![structure with C₂H₄CN, C₂H₄OCO-, CH₃, N⁺-CH₃SO₄⁻] | Yellowish brown. |
| 2 | 2-amino-5-nitrothiazole | Same as above | Violet. |
| 3 | 2-amino-6-nitrobenzthiazole | do | Ruby red. |
| 4 | 2-amino-6-cyanobenzthiazole | do | Red. |
| 5 | 2-chloro-4-nitroaniline | ![structure with CH₃ on benzene, C₂H₄CN, C₂H₄OCO-, CH₃, N⁺-CH₃SO₄⁻] | Red. |
| 6 | 5-amino-3-methyl 1,2 4-thiadiazole | ![structure with C₂H₄CN, C₂H₄OCO-, N⁺(CH₃)₂ CH₃SO₄⁻] | Scarlet. |
| 7 | 2-amino-5-methylsulfonyl thiazole | ![structure with C₂H₄OCO-, N⁺(CH₃)₂ CH₃SO₄⁻] | Violet. |
| 8 | 2-amino-5-cyanothiazole | ![structure with C₂H₂OC₂H₄CN, CH₃CH-OCO-, CH₃, N⁺-CH₃ CH₃SO₄⁻] | Do. |
| 9 | 2-amino-6-methylsulfonyl benzthiazole | ![structure with C₂H₄OC₂H₄CN, C₂H₄OCO-, N⁺-CH₃ CH₃SO₄⁻] | Ruby red. |
| 10 | 2-amino-5-phenyl-1,3,4-thiadiazole | ![structure with CH₂-CH₂/CH₂ ring, N-CH₂CH₂OCO-, N⁺-CH₃ CH₃SO₄⁻] | Red. |

EXAMPLE 10

15.2 parts of 3-nitro-4-aminotoluene are diazotized and coupled with 18.9 parts of 1-[3'-aminophenyl]-3-methylpyrazolone-(5) in a solution rendered alkaline with sodium carbonate.

The dyestuff formed is isolated and dried, reacted with nicotinyl chloride as described in Example 8 and quaternated with dimethyl sulphate.

The new, water-soluble dyestuff of the formula

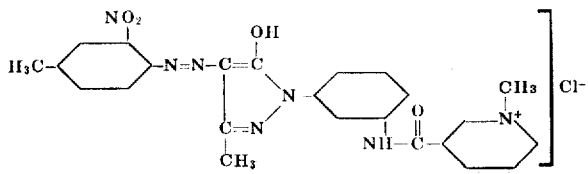

forms a yellow powder which dyes polyacrylonitrile fibers brilliant yellow shades having very good fastness to light.

By using 2-nitraniline, 2-nitro-4-chloraniline or 2-nitro-4-methoxyaniline as the diazo component, dyestuffs are obtained that likewise dye polyacrylonitrile fibers yellow shades which are fast to light.

Very good dyestuffs are also obtained by using as the coupling component 1-[4'-aminophenyl]-3-methylpyrazolone-(5), 1-[2'-aminophenyl]-3-methylpyrazolone-(5) or 1-[β-hydroxy-ethyl]-3-methylpyrazolone-(5).

Then the diazo compounds of the amines listed in column I of the table below are coupled in the same manner with the coupling components mentioned in column II and the resulting compounds are acylated with the acid chlorides mentioned in column III, and the azo dyestuffs so obtained are finally quaternated with the alkylating agents mentioned in column IV, dyestuffs are obtained which have similar properties and dye acrylonitrile fibers the shades shown in column V.

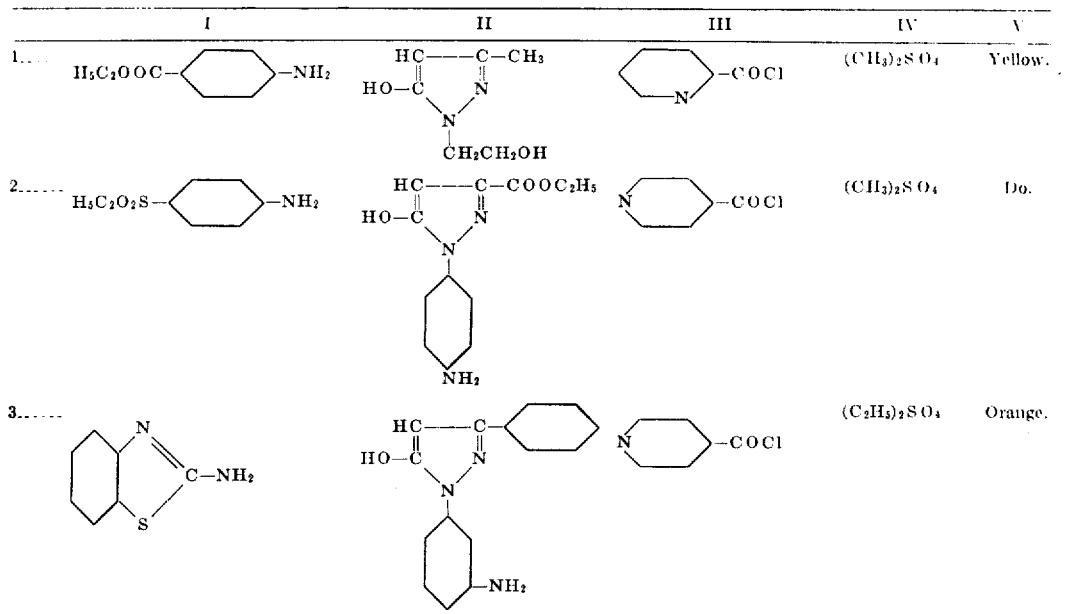

EXAMPLE 11

17.25 parts of 2-chloro-4-nitraniline are diazotized and coupled with 26.4 parts of 1-nicotinylamino-7-hydroxynaphthalene in a solution rendered alkaline with sodium carbonate. The dyestuff formed is isolated, dried and quaternated in the usual manner in chlorobenzene with dimethyl sulphate.

The new, water-soluble dyestuff of the formula

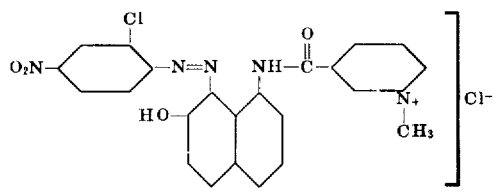

forms a brown powder which dyes polyacrylonitrile fibers scarlet shades of very good fastness to light.

By using as the diazo component 2-amino-5-nitrophenyl-methyl-sulphone, 2-amino-4-nitrotoluene, 2- or 4- nitraniline or 2-nitro-4-chloraniline, dyestuffs are obtained which have equally good properties.

EXAMPLE 12

21.75 parts of 4.6-dinitro-2-chloraniline are diazotized and coupled with 30 parts of 2-(N-diethylamino-4-nicotinylamino-anisole) in an acetic acid solution. The dyestuff formed is isolated, dried and quaternated with dimethyl sulphate in nitrobenzene.

The new, water-soluble dyestuff of the formula

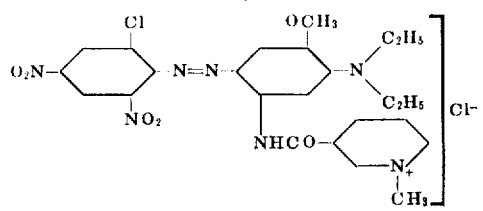

forms a dark powder which dyes polyacrylonitrile fibers reddish blue shades which are very fast to light.

By using 2-nitro-4-chloraniline, 2-cyano-4-nitraniline or 4,6-dinitrol-2-bromaniline as the diazo component, dyestuffs are obtained which have the same good properties.

Very good dyestuffs are also obtained by using as coupling component 2-(N-dimethylamino)-4-nicotinylaminoanisole or 2-(N,β-cyanoethyl-N-methylamino)-4-nicotinylaminoanisole.

EXAMPLE 13

38.4 parts of 2-nitrodiphenylamine-4-sulphonic acid-4'-amino-anilide in 200 parts of pyridine are mixed at 80°to 85°C with 19.2 parts of nicotinylchloride-N-methylchloride and the batch is stirred for 3 hours at 80°to 85°C. The batch is poured into 1,000 parts of water, hydrochloric acid is added to obtain an acid reaction to Congo red and the whole is filtered hot with active carbon. The dyestuff is salted out of the filtrate with sodium chloride, isolated and dried under vacuum.

The new, water-soluble dyestuff of the formula

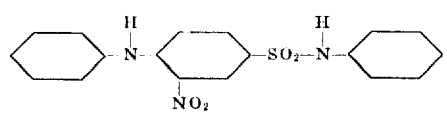

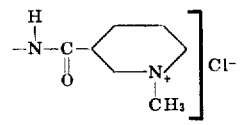

forms a yellow powder which dyes polyacrylonitrile fibers yellow shades of very good fastness to light.

Dyestuffs having equally good properties are formed by using as starting material 2-nitrodiphenylamine-4-sulphonic acid-N,β-hydroxyethylamide, 2-nitrodiphenylamine-4-sulphonic acid-N,β-aminoethylamide, 2-nitrodiphenylamine-4-sulphonic acid-β-hydroxyethyl ether or 4'-aminodiphenylamine sulphonylethylamide.

Nicotinylchloride-N-methylchloride is prepared in the following manner:

12.3 parts of nicotinic acid in 70 parts of dimethyl sulphate are stirred for 1½ hours at 110°to 115°C, cooled to 0°C, the whole is filtered and the residue dissolved in water, neutralized with barium hydroxide and filtered with addition of active carbon. Hydrochloric acid is added to the filtrate until an acid reaction to Congo is obtained and it is then evaporated in a rotary evaporator.

The finely comminuted, dust-dry product is added at room temperature to 20 parts of thionyl chloride, and while stirring vigorously the temperature is raised within 20 minutes from 20°to 68°C, whereupon the product dissolves, accompanied by a strong evolution of sulphur dioxide and hydrogen chloride gas. When the evolution of gases ceases, the excess thionyl chloride is distilled off. Nicotinylchloride methylchloride settles out as a waxy, white substance which can be used directly.

EXAMPLE 14

30.4 parts of 3-hydroxy-4'-aminoquinophthalone in 300 parts of pyridine are mixed at 80°to 85°C with 19.2 parts of nicotinyl-chloride-N-methylchloride and the batch is stirred for 3 hours at 80°to 85°C, then poured into 1,200 parts of water; hydrochloric acid is added until an acid reaction to Congo red is obtained and the whole is filtered hot through active carbon. The dyestuff is salted out of the filtrate with sodium chloride, suction-filtered and dried under vacuum.

The new, water-soluble dyestuff of the formula

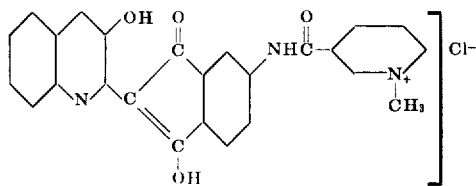

forms a yellow powder which dyes polyacrylonitrile fibers yellow shades which are very fast to light.

Dyestuffs have equally good properties are obtained by reacting 3-hydroxy-3'-aminoquinophthalone or 3,4'-dihydroxyquinophthalone with nicotinylchloride-N-methylchloride.

We claim:

1. A basic azo-dyestuff free from sulfonic and carboxylic acid groups, in which the cation corresponds to the formula

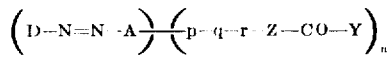

wherein D is selected from the group consisting of thiazolyl, benzthiazolyl, thiadiazolyl, thiazolyl substituted by nitro, methylsulfonyl or cyano, benzthiazolyl substituted by nitro, cyano, methylsufonyl or chloro, thiadiazolyl substituted by methyl or phenyl and substituted benzene wherein the substituents are selected from the group consisting of chloro, bromo, cyano, nitro, phenylazo, lower alkyl, lower alkoxy, trifluoromethyl, carbalkoxy, lower alkylsulphonyl, lower N-alkylsulfonamide and A is lower alkylpyrazolone, phenyl-pyrazolone, hydroxynaphthalene, 4-hydroxy-N-alkylquinolone, or benzene or substituted benzene wherein the substituent is selected from the group consisting of chloro, bromo, hydroxy, lower alkyl, lower alkoxy, lower alkanoylamino, lower alkylamino, phenyl or cyclohexyl, $p$ is —CO—, —SO$_2$— or a direct linkage, $q$ is oxygen, imino or a direct linkage, $r$ is lower alkyl-, phenyl, methylphenyl, benzyl or may also be a direct linkage if $p$ and $q$ are also direct linkages, Y is unsubstituted quaternized pyridine or quinoline bound to CO via a ring carbon atom, Z is a member of the group of oxygen, imino, N-methylimino, N-phenylimino and $n$ is 1 or 2, and in which dyestuff the anion is selected from the group consisting of sulfate, phosphate, sulfonate, bromide, chloride, iodide, $C_{1-4}$ alkyl carboxylic acid, $ZnCl_3$ and $CdCl_3$ and "lower" means "including up to four carbon atoms."

2. A basic azo dyestuff of the formula

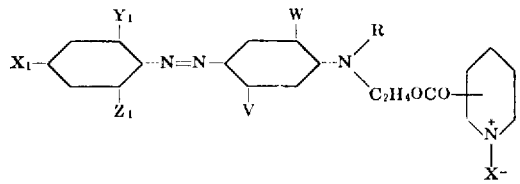

in which $X_1$ represents a member selected from the group consisting of hydrogen, chlorine, bromine, cyano, lower carbalkoxy, lower alkylsulfonyl, phenylazo and nitro, $Y_1$ is a member selected from the group consisting of hydrogen, chlorine, bromine, lower alkyl, lower alkoxy, trifluoromethyl, lower carbalkoxy, cyano and nitro, $Z_1$ is a member selected from the group consisting of hydrogen, chlorine and bromine, at least one of the radicals $X_1$ and $Y_1$ standing for a member selected from the group consisting of a nitro, lower carbalkoxy, cyano, lower alkylsulfonyl and phenylazo, V represents a member selected from the group consisting of hydrogen, chlorine, bromine, lower alkyl, lower alkoxy and lower alkanoylamino, W is a member selected from the group consisting of hydrogen, lower alkyl, lower alkoxy, R represents an alkyl, carbalkoxyethyl, cyanoethyl and lower alkoxyalkyl and X is an anion selected from the group consisting of sulfate, phosphate, sulfonate, bromide, chloride, iodide, $C_{1-4}$ alkyl carboxylic acid, $ZnCl_3$ and $CdCl_3$.

3. The dyestuff of the formula

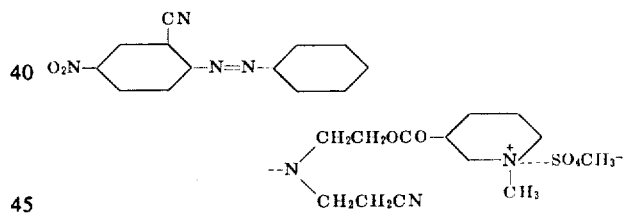

4. The dyestuff of the formula

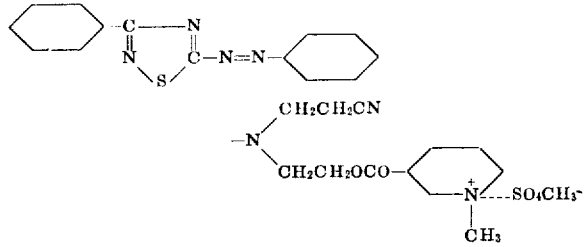

5. The dyestuff of the formula

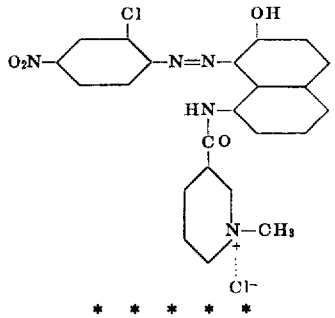

* * * * *

UNITED STATES PATENT OFFICE
CERTIFICATE OF CORRECTION

Patent No. 3,687,929　　　　　　Dated August 29, 1972

Inventor(s) VISVANATHAN RAMANATHAN ET AL

It is certified that error appears in the above-identified patent and that said Letters Patent are hereby corrected as shown below:

Cover page, after the Inventors and before "[22]" insert ---

Assignors to CIBA-GEIGY AG, Ardsley, N.Y., a corporation of New York -- .

Signed and sealed this 6th day of August 1974.

(SEAL)
Attest:

McCOY M. GIBSON, JR.　　　　　　C. MARSHALL DANN
Attesting Officer　　　　　　　　Commissioner of Patents

UNITED STATES PATENT OFFICE
CERTIFICATE OF CORRECTION

Patent No. 3,687,929      Dated August 29, 1972

Inventor(s) Visvanathan Ramanathan et al.

It is certified that error appears in the above-identified patent and that said Letters Patent are hereby corrected as shown below:

On the cover sheet insert -- [73] Assignee: Ciba-Geigy AG, Basle, Switzerland --.

This certificate supersedes Certificate of Correction issued Aug. 6, 1974.

Signed and sealed this 26th day of November 1974.

(SEAL)
Attest:

McCOY M. GIBSON JR.
Attesting Officer

C. MARSHALL DANN
Commissioner of Patents